US012568876B2

(12) United States Patent
Weimer et al.

(10) Patent No.: US 12,568,876 B2
(45) Date of Patent: Mar. 10, 2026

(54) METHOD FOR CLASSIFYING PLANTS FOR AGRICULTURAL PURPOSES

(71) Applicant: Robert Bosch GmbH, Stuttgart (DE)

(72) Inventors: Andreas Weimer, Gaertringen (DE); Farid Khani, Boennigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 299 days.

(21) Appl. No.: 18/006,893

(22) PCT Filed: Nov. 25, 2021

(86) PCT No.: PCT/EP2021/082920
§ 371 (c)(1),
(2) Date: Jan. 26, 2023

(87) PCT Pub. No.: WO2022/128382
PCT Pub. Date: Jun. 23, 2022

(65) Prior Publication Data
US 2023/0301228 A1 Sep. 28, 2023

(30) Foreign Application Priority Data
Dec. 15, 2020 (DE) .................... 10 2020 215 876.2

(51) Int. Cl.
*G06V 20/10* (2022.01)
*A01C 23/00* (2006.01)
(Continued)

(52) U.S. Cl.
CPC ............ *A01C 23/007* (2013.01); *A01G 13/00* (2013.01); *A01G 25/09* (2013.01); *A01M 7/0089* (2013.01);
(Continued)

(58) Field of Classification Search
CPC ...... G06V 10/16; G06V 10/98; G06V 10/764; G06V 20/188; A01B 79/005;
(Continued)

(56) References Cited

U.S. PATENT DOCUMENTS 10,255,670 B1 * 4/2019 Wu ........................ H04N 7/183

FOREIGN PATENT DOCUMENTS

DE 102017210804 A1 12/2018
DE 102017217258 A1 3/2019
(Continued)

OTHER PUBLICATIONS

Shrestha, D. S., Brian L. Steward, and Stuart J. Birrell. "Video processing for early stage maize plant detection." Biosystems engineering 89.2 (2004): 119-129. (Year: 2004).*
(Continued)

*Primary Examiner* — Tracy Mangialaschi
(74) *Attorney, Agent, or Firm* — NORTON ROSE FULBRIGHT US LLP

(57) ABSTRACT

A method for classifying plants for agricultural purposes. The method includes: detecting a field section having plants using an optical detection unit inclined toward the field section to obtain image information having a rear image edge having an image width and a front image edge having a larger image width; classifying the plants in the image information into first and second plant classes using an algorithm to treat the plants of the second plant class with a liquid spray agent, in accordance with the classification. The step of classifying comprises a step of reclassifying, in which classified plants are reclassified from the second plant class to the first plant class using the algorithm if they extend in a rear image section of the image information defined by
(Continued)

a defined image separation line from a lateral image edge of the image information maximally up to a defined reclassification boundary line.

16 Claims, 4 Drawing Sheets

(51) Int. Cl.
| | |
|---|---|
| *A01G 13/00* | (2006.01) |
| *A01G 25/09* | (2006.01) |
| *A01M 7/00* | (2006.01) |
| *G05B 19/416* | (2006.01) |
| *G06V 10/764* | (2022.01) |
| *G06V 10/98* | (2022.01) |

(52) U.S. Cl.
CPC ......... *G05B 19/416* (2013.01); *G06V 10/764* (2022.01); *G06V 10/98* (2022.01); *G06V 20/188* (2022.01); *G05B 2219/45013* (2013.01)

(58) Field of Classification Search
CPC ...... A01C 23/007; A01G 13/00; A01G 25/09; A01M 7/0089; G05B 19/416; G05B 2219/45013; G06T 7/0012; G06T 2207/10036; G06T 2207/10048; G06T 2207/10024; G06T 2207/30188
See application file for complete search history.

(56) References Cited

FOREIGN PATENT DOCUMENTS

| | | |
|---|---|---|
| DE | 102018217742 A1 | 4/2020 |
| DE | 102018222428 A1 | 6/2020 |

OTHER PUBLICATIONS

International Search Report for PCT/EP2021/082920, Issued Mar. 17, 2022.

\* cited by examiner

METHOD FOR CLASSIFYING PLANTS FOR AGRICULTURAL PURPOSES

FIELD

The present invention relates to a method for classifying plants, in particular for agricultural purposes, a corresponding classification unit and an agricultural spray device for applying a medium, in particular liquid spray agent.

BACKGROUND INFORMATION

In the case of multi-camera applications, stitching algorithms are available in which same structures are searched for in adjacent images and then these are assembled into a large image.

However, this method is not applicable in systems, if there is no data flow between the cameras and/or the required running time/computing power is too high. This is often the case for agricultural applications, such as for example on field sprayers, because the cameras must function independently, i.e., data of the neighboring cameras are not available, and shorter running times and lower computing power are also necessary for economic reasons.

One challenge that arises with unstitched images in the agricultural area is that plant objects that are on the image edge and are thus only partially visible are possibly misclassified. In this case, cultivated plant parts may be wrongly assigned when cultivated plants or a row of cultivated plants are cut by the edge of the view field, as such parts are most often classified by definition as weeds.

A method for classifying plants is described in German Patent Application No. DE 10 2017 210 804 A1. In this method, an area of a usable surface is detected using an optical and/or infrared detection unit and the detected image data is evaluated. The aim is to recognize agricultural plants arranged in the form of plant rows in order to be able to distinguish the agricultural plants from plants located between the agricultural plants or plant rows, which are particularly classified as weed, for example, in order to be able to treat the latter using corresponding spray agents.

SUMMARY

The present invention includes a method for classifying plants, particularly for agricultural purposes. According to an example embodiment of the present invention, the method includes the following steps:

detecting a field section with plants using an optical detection unit inclined toward the field section in order to obtain image information having a rear image edge having an image width W(image, r) and a front image edge having a larger image width W(image, f);

classifying the plants in the obtained image information into at least one first plant class and into at least one second plant class using an algorithm in order to treat the plants of the second plant class with a medium, in particular liquid spray agent, depending thereon, wherein the step of classifying comprises a step of reclassifying, in which classified plants are reclassified from the second plant class into the first plant class using the algorithm, if they extend in a rear image section of the image information defined by a defined image separation line from a lateral image edge of the image information maximally up to a defined reclassification boundary line.

Further, the present invention also includes a classification unit. According to an example embodiment of the present invention, the classification unit is configured to carry out the following steps:

classifying plants in obtained image information into at least one first plant class and into at least one second plant class using an algorithm; and reclassifying classified plants from the second plant class into the first plant class using the algorithm, if they extend in a rear image section of the image information defined by a defined image separation line from a lateral image edge of the image information maximally up to a defined reclassification boundary line.

The present invention also relates to an agricultural spray device for applying a medium, in particular liquid spray agent onto plants of an agricultural area with at least one spray nozzle unit for applying the medium, at least one optical detection unit for detecting the plants and a classification unit for classifying the plants described above.

The present invention also relates to a computer program configured to execute the steps of a method described above and/or classification unit described above, if the computer program is executed on a computer, and a machine-readable storage medium having the computer program saved thereon.

The method is intended for, but not limited to, agricultural purposes. An agricultural purpose in the context of the present invention may be understood to mean a purpose directed to economic cultivation of agricultural crops.

The term "plant" naturally also comprises plant parts, or plant components such as, e.g., plant leaves, plant stems and plant stalks.

The application of the medium or spray agent is preferably performed on an agricultural area or an agriculturally used land. This can be understood to mean a field or a cultivable area of plants, or also a land parcel of such a cultivable area. The agricultural area may thus be an arable land, a grassland or a pasture. For example, the plants may comprise agricultural crops, whose fruit is agriculturally used (for example, as food, feed, or energy plants) as well as weeds.

Preferably, all steps of the method are carried out during movement, in particular during a drive or a flight of the agricultural spray device over the agricultural area. Thus, in the context of the present application, depending on the design of the spray device, the term "driving direction" may also be understood to mean a "flying direction".

According to an example embodiment of the present invention, advantageously, the agricultural spray device is configured to carry out the method in an automated and/or autonomous fashion to enable a quick, reliable, and efficient treatment of a field.

The agricultural spray device may in particular be part of an agricultural field sprayer or a plant protection equipment or be configured as an agricultural field sprayer or a plant protection equipment. The agricultural spray device may comprise a mobile unit or may be arranged on a mobile unit, wherein the mobile unit may be configured in particular as a land vehicle and/or an aircraft and/or a trailer. The mobile unit may in particular be an agricultural work machine, for example a towing vehicle, a tractor, a self-driving or autonomous field sprayer, or a self-driving or autonomous robot. The agricultural spray device may in particular be a towed field sprayer, a self-driving field sprayer, or an attachment field sprayer. The agricultural spray device may also be attached to a hydraulic device of an agricultural work machine. It is also possible that the agricultural spray device is mounted on a loading area of an agricultural work machine. Alternatively, the spray device may be hitched to the agricultural work machine. The agricultural spray device or field sprayer may have at least one spray agent tank for accommodating the spray agent. The agricultural spray device or the field sprayer may also have a mixing unit, which mixes a spray agent concentrate with water directly on the agricultural spray device to form the spray agent to be applied.

The medium or spray agent is in particular a spray liquid. The spray agent may be an agricultural preparation or plant protection product (PPP), in particular a plant protection product concentrate. The spray agent may accordingly include a pesticide, such as herbicide, fungicide or an insecticide. However, the spray agent may also include or be a fertilizer, in particular a fertilizer concentrate. The spray agent may include a growth regulator in this case. The spray agent may include a granular active agent which has been mixed with a carrier liquid. For example, the spray liquid may be configured as: liquid, suspension, emulsion, solution or a combination thereof. The spray liquid is preferably formed as a water-diluted plant protection product or as a water-diluted fertilizer. Accordingly, the spray liquid may be, for example, a spray mixture.

According to an example embodiment of the present invention, the application of the medium or spray agent may in particular be carried out using a conveyor unit. In this case, the conveyor unit may be configured to convey or conduct, in particular to meter a liquid and/or a granulate under pressure. Accordingly, the conveyor unit may each comprise, for example, one or more pumps, conveyor pumps, metering pumps, pressure tanks, screw conveyors, valves, orifices, etc. The spray nozzle unit preferably has at least one spray nozzle for applying the spray agent and at least one valve for controlling or regulating the amount of spray agent applied. Accordingly, the spray nozzle unit is controllable or actuatable. The valve may be arranged or integrated in the spray nozzle. However, the valve may also be arranged upstream (in the direction of flow of the spray agent) of the spray nozzle. However, the spray nozzle unit may also have several spray nozzles each having an upstream valve. The spray nozzle unit may further also have several spray nozzles having only one valve upstream of the spray nozzles, such that when the valve is actuated, the spray agent is applied using all the spray nozzles of the spray nozzle unit. The valve may be configured as a pulse width modulated (PWM) valve or a proportional valve. The spray nozzle unit may be configured as a partial width of a nozzle system of the agricultural spray device. The spray nozzle units may be controlled individually or separately and/or in defined groups or assemblies and/or all jointly. The spray nozzles of each spray nozzle unit may be controlled individually or separately and/or in defined groups or assemblies and/or all jointly.

According to an example embodiment of the present invention, one or more spray nozzle unit(s) or spray nozzle (s) of a spray nozzle unit may be assigned to each field section row (=field sections along the movement or driving direction). For example, each field section row may be assigned exactly one spray nozzle unit or spray nozzle of a spray nozzle unit or exactly two spray nozzle units or spray nozzles of a spray nozzle unit, in order to treat classified plants in this field section row.

The optical detection unit is preferably arranged on the agricultural spray device. The optical detection unit may comprise at least one multispectral and/or hyperspectral and/or infrared camera and/or 3D camera. The optical detection unit may be configured to detect or record images in the NIR and/or visual range. The optical detection unit may have a light or lighting unit. The optical detection units may be configured to communicate with one another. Preferably, however, the optical detection units are configured such that they are not in communication with one another. An optical detection unit can be assigned to each field section row. However, it is also possible that an optical detection unit detects two or more field section rows. Preferably, an optical axis of the at least one optical detection unit has an inclination angle greater than 0°, preferably 25° relative to the vertical in the direction of travel of the spray device. That is, in other words, the optical detection unit is inclined forward in the direction of travel. This produces a trapezoidal field of view or image field.

Preferably, the spray nozzle unit or the spray nozzle units and the optical detection unit or the optical detection units are arranged on a sprayer boom of the agricultural spray device.

The step of detecting the field sections may occur, for example, as the agricultural spray device with the optical detection units travels over the field. In the process, field sections situated side by side are understandably detected at essentially the same time by the optical detection units.

The method or the method steps is/are understandably carried out repeatedly. Here, the steps of detecting the field sections in the direction of travel are preferably carried out or repeatedly carried out at a defined, in particular fixed time interval or at a time interval adjusted to the speed of the agricultural spray device. That is to say, in other words, that the field sections are detected at a defined or a speed-dependent image rate or image frequency (=repeat rate).

A detected field section may be a detection section or a detected image section of an optical detection unit. Preferably, the detected field section is the entire field section detected in the field of view of the optical detection unit.

The image information represents a respective detected field section. The image information is preferably an image of the respectively detected field section. As the field sections are preferably detected at an inclination angle of an optical axis of the optical detection unit of greater than 0°, preferably 25° relative to the vertical in the direction of travel of the spray device, the image information in the direction of movement or travel has a rear image edge having an image width W(image, r) and a front image edge having a larger image width W(image, f). That is, in other words, the image information is trapezoidal in shape.

Plants are identified and classified in the image information. The step of identifying plants may comprise detecting a color component, in particular a green color component and/or an infrared component in the field section/field evaluation area or image section/image evaluation area. Here, plants may be detected using the optical detection unit, e.g., using a predetermined NDVI value (normalized differenced vegetation index, which is formed from reflection values in the near infrared and visible red wavelength range of the light spectrum) by distinguishing biomass or vital plants and plant parts from the soil. In the step of classifying, the plants in the obtained image information are classified into at least one first plant class and into at least one second plant class using an algorithm or are assigned to these plant classes in order to treat plants of the second plant class with a medium, in particular liquid spray agent, depending on this classification. Preferably, plants are classified into the first plant class as agricultural crops and/or cultivated plants and/or are classified into the second plant class as weeds.

Here, the step of classifying comprises, according to the present invention, a step of reclassifying (new classification), in which classified plants are reclassified from the second plant class into the first plant class by the algorithm, if they extend, in particular completely, in a rear image section of the image information defined by a defined image separation line from a lateral image edge of the image information maximally up to a defined reclassification boundary line.

That is, in other words, what initially were classified into the second plant class or were classified as "weeds" are reclassified into the first plant class or are classified as "cultivated plants" if they are located, in particular entirely, in a rear image section of the image information defined by an image separation line, and abut a lateral image edge of the image information, and extend maximally up to a defined reclassification boundary line of the image information.

Conversely, this means that in the step of classifying into the second plant class, classified plants remain in this plant class if they are not in the rear image section of the image information and/or do not abut a lateral image edge of the image information and/or if they extend from the lateral image edge of image information across the reclassification boundary line.

According to an example embodiment of the present invention, preferably, the image information has an upper overlap area with forward image information, situated in particular spatially and/or temporally upstream, a position of the image separation line in the image information being selected depending on the upper overlapping area, in particular the image separation line being aligned with a rear overlapping edge of the upper overlapping area. That is, in other words, the image rate or image frequency (=repeat rate) of the optical detection unit and the travel speed are coordinated with one another such that the image information partially overlaps with forward image information detected (by the optical detection unit) previously and spatially further ahead in the direction of movement. Preferably, the image separation line aligns with a rear image edge of the forward image information. However, the image separation line may also be specified manually. The image separation line may in particular be arranged horizontally in the image information.

The image information preferably has a lateral overlapping area with at least one piece of, in particular laterally situated and/or simultaneously detected, lateral image information, wherein a position of the reclassification boundary line in the image information is selected depending on the lateral overlapping area, in particular intersecting a lateral overlapping edge of the lateral overlapping area. Alternatively or additionally, the reclassification boundary line may be selected depending on a crop type and/or growth stage of the cultivated plants. However, the reclassification boundary line may also be specified manually. The lateral overlapping area is preferably triangular. The reclassification boundary line may in particular be arranged vertically in the image information.

The image separation line, the reclassification boundary line and the lateral overlapping edge are preferably arranged to have a common intersection point. Thus, the position of the reclassification boundary line may result, for example, depending on the upper and the lateral overlapping area.

Advantageously, both lateral image edges of the image information are each assigned one reclassification boundary line.

According to an example embodiment of the present invention, to realize the lateral overlapping areas several optical detection units are preferably arranged transversely to the direction of movement or travel such that the front and rear image edges of the image information respectively align with one another. Accordingly, the optical detection units are preferably arranged such that their optical axes run along a common plane transverse to the direction of travel.

According to an example embodiment of the present invention, preferably, a step of identifying plant rows in the image information using classified plants of the first plant class in the image information may be provided using an algorithm, wherein in the step of applying, the medium or spray agent may further be applied depending on identified plant rows. The step of identifying or detecting plant rows may be carried out continuously or permanently. The step of identifying plant rows is preferably performed using and/or evaluating all or substantially all of the obtained image information, i.e., over the entire depth D (image).

According to an example embodiment of the present invention, advantageously, identifying the plant row may be performed using at least one of the following items of information: Color component, in particular green color component of the detected plants, infrared component of the detected plants, plant spacing, plant row spacing, growth stage of the plants, geocoordinates of a sowing of the plants, direction of movement of the optical detection unit or the direction of travel of the agricultural spray device. Using this information or these properties, the plant rows may be identified in a simple and reliable way. Since plant rows extend substantially in a straight line, the identification of a plant row may also be performed, for example, by adjusting a straight line or a straight plant row center line into an image trajectory with the highest green color component or green value. In the step of identification, preferably all plant rows in the detected field section or the obtained image information are identified.

According to an example embodiment of the present invention, preferably, a step of determining a plant identification number for a defined image evaluation area in the obtained image information is provided using the classified plants of the second plant class in the defined image evaluation areas using an algorithm.

The plant identification number represents or is preferably a degree of coverage of the corresponding image evaluation area or field evaluation area of plant material and/or an amount of plant material in the image evaluation area or field evaluation area and/or the number of classified plants of the second plant class in the image evaluation area or field evaluation area. The degree of coverage may be defined via the ratio of surface area covered by plant material to the total surface area to be evaluated. The degree of coverage for the image evaluation area or field evaluation area is accordingly the ratio of the surface area of the planted area to the respective total image evaluation area. To this end, the number of pixels in the respective image evaluation area, on which plant material is detected, may be determined. Accordingly, using the plant identification number, a measure may be derived for the infestation, depending on which a decision is made as to whether and, if indicated, how (e.g., with what application amount) the corresponding field evaluation area is sprayed or treated.

According to an example embodiment of the present invention, the threshold value may be a manually entered value, a previously determined value transmitted to the system, or a preset value fixed in the system. Depending on the crop in the field, the growth stage and the used spray agent or plant protection product, a so-called spray rule may be stored for this purpose, i.e., a relationship between a specific plant identification number and the decision as to whether and how much plant protection product should be applied. As an example, the rule might be: "If the degree of coverage in the evaluation area exceeds 0.5%, plant protection product is applied to the field evaluation area."

In this case, the image evaluation area preferably has a width B(evaluation) greater than or equal to the rear image width W(image, r) and smaller than the front image width W(image, f) of the image information. The image evaluation area preferably has a rectangular shape.

Here, the image evaluation areas are configured so as to abut one another in the lateral overlapping area and have a depth D(evaluation) in the direction of travel of the agricultural spray device, which is less than or equal to a depth of the overlapping area D(overlap).

According to an example embodiment of the present invention, preferably, the image evaluation areas in the direction of travel each have a rear evaluation edge having a width W(evaluation, r) and a front evaluation edge of equal size having a width W(evaluation, f). The width W(evaluation) of the image evaluation areas may be predefined or manually selectable in this case. However, the width W(evaluation) of the image evaluation areas can also be variably selected or adjusted using the classification unit or a control unit of the classification unit, so that interferences may be compensated for and the abutting arrangement of the image evaluation areas with respect to one another may be ensured. The front and rear evaluation edges of the image evaluation areas are preferably aligned with one another. The front evaluation edges of the image evaluation areas may be further aligned with the front image edges of the image information. Preferably, a common lateral edge of the image evaluation areas is arranged transversely to the direction of travel centrally in the lateral overlapping area.

It should be noted that further separate image evaluation areas may be provided in the image information without leaving the scope of the present invention. The image evaluation area according to the present invention has a lateral evaluation edge arranged in the lateral overlapping area. In the image information, a further image evaluation area may be provided, which has a lateral evaluation edge in a lateral overlapping area at an opposite lateral image edge of the image information. Additionally, the image information may have one or more centrally arranged image evaluation areas that do not extend up to a lateral overlapping area. The number of image evaluation areas per image information is dependent on the spray nozzle spacing and the width of the image information. Each image evaluation area may be respectively assigned to a spray nozzle unit having one or more spray nozzles. For example, at an image information width of 1.5 m and 25 cm spray nozzle spacing, 6 image evaluation areas per camera would be provided.

Thus, the image evaluation areas are the areas of the image information, in which the plant identification numbers are determined and evaluated in order to apply the medium or spray agent accordingly. The image evaluation areas represent in this case a corresponding field evaluation area of the detected field sections, such that, in the step of applying, the spray agent is preferably applied to the corresponding field evaluation area(s).

According to an example embodiment of the present invention, in the step of application, in a positive "spray decision", the spray agent is applied using the spray nozzle unit of the agricultural spray device, depending on the determined plant identification numbers, in particular when reaching and/or falling below and/or exceeding a defined threshold value for the plant identification number. Preferably, the spray agent is applied with a defined minimum amount per surface area. In this case, the spray agent is preferably applied to the entire field evaluation area. The field evaluation areas, on which spray agent is applied with a defined minimum amount per surface area, are also hereinafter referred to as sprayed or treated field evaluation areas.

According to an example embodiment of the present invention, the classification unit comprises an algorithm for classifying and reclassifying the plants in the image information. The classification unit may comprise a computing unit or a plurality of computing units for processing signals or data, at least one storage unit for saving signals or data, at least one communication interface for reading in data, in particular for receiving image information, and a control unit for outputting data, in particular control signals to a unit, in particular an actuator. Each optical detection unit may be assigned a classification unit, or each optical detection unit may have its own classification unit. The classification unit is or the classification units are configured or set up for image processing so as to execute computing steps or image processing steps for carrying out the method according to the present invention. Accordingly, each classification unit has a corresponding image processing software. The computing unit may be, for example, a signal processor, a microcontroller, or the like, while the storage unit may be a flash memory, an EEPROM, or a magnetic storage unit. The communication interface may be configured to read in or output data in a wireless and/or wired manner, a communication interface capable of reading in or outputting wired data being able, for example, to read in the data electrically or optically from a corresponding data transmission line or output them into a corresponding data transmission line.

Accordingly, the method of the present invention may be implemented, for example, in software or hardware or in a mixed form of software and hardware in a classification unit or a controller.

The classification unit may be arranged fully or partially on the agricultural spray device or integrated into it. However, the classification unit may also be fully or partially externally integrated, for example, in a cloud.

The definition of the image separation line and/or the reclassification boundary line and/or the image evaluation area may be performed either within a downstream image processing software of the classification unit or, if assisted by the optical detection unit or camera, directly as an ROI definition (region of interest) at the level of the imager chip of the optical detection unit or camera.

The method according to the present invention enables efficient and accurate classification, in particular of plants cut off at the image edge or only partially captured, which may advantageously be carried out using self-contained optical detection units or cameras. Here, the method makes use of the fact that in trapezoidal images, plants are mostly completely visible in the front image section and thus may be correctly classified whereas the same plants in subsequent images after a forward movement are in the rear image section, and are thus partially cut off at the lateral image edge, thereby increasing the risk of misclassification. Thus, while these plants in the rear image section are classified as agricultural crops, and thus are never recognized as weeds in the current image (even if they possibly are such), due to the overlapping of the images in the direction of travel, these plants in the previous image were in the front image section that was normally evaluated, as a result of a correct image evaluation occurred for a "spraying decision".

The increased classification quality in turn results in a more precise application of, for example, plant protection product, because an application need may occur due to a correct classification of the plants. Furthermore, the method according to the present invention allows for a fast and efficient working speed, in particular when treating an agricultural area, e.g., using a field sprayer, due to the little required running times and computing power.

BRIEF DESCRIPTION OF THE DRAWINGS

The present invention will be explained in more detail in the following with reference to the figures.

DETAILED DESCRIPTION OF EXAMPLE EMBODIMENTS

In the following description of preferred embodiment examples of the present invention, identical or similar reference numbers are used for the elements that are shown and act similarly in the various figures, a repeated description of these elements being omitted.

Figure 1:
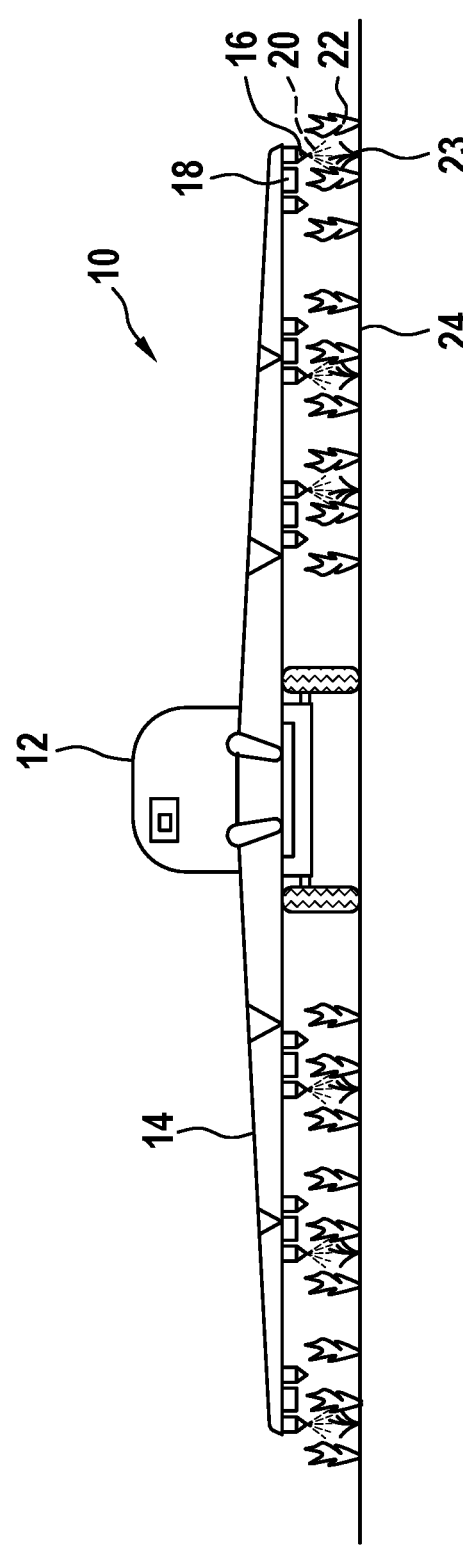
FIG. 1 shows a schematic illustration of an agricultural spray device according to an example embodiment of the present invention.

In FIG. 1 a schematic illustration of an agricultural spray device is shown, which is provided in its entirety with the reference number 10.

The agricultural spray device 10 is configured as a field sprayer 10. The field sprayer 10 is arranged on a mobile land vehicle 12, which is configured as a tractor 12.

The agricultural spray device 10 has a spray boom 14. Spray nozzle units 16 and optical detection unit 18 are arranged on the spray boom 14. The spray nozzle units 16 are configured to apply a spray agent 20 onto plants 22 or weeds 23 of an agricultural area 24. The optical detection units 18 are configured as optical cameras 18. The optical cameras 18 each comprise a filter unit in order to extract a color component, for example the green component of an obtained or detected item of image information, or of a detected image, to detect plants 22 or weeds 23.

The agricultural spray device 10 further has a conveyor unit (not shown), which makes it possible to adjust or vary the amount of application or the amount of an active agent in the spray agent 20 to be applied.

The agricultural spray device 10 also has classification units (not shown), which are connected to the optical cameras 18 in order to receive information from them. In this case, each optical camera 18 is respectively assigned its own classification unit. The classification units have a computing unit, which is configured to carry out calculation steps or image processing steps for executing the method according to the present invention. The classification units are further configured to output a control signal such that the spray agent 20 is applied by the associated spray nozzle units 16 depending on the determined plant identification number.

Figure 2:
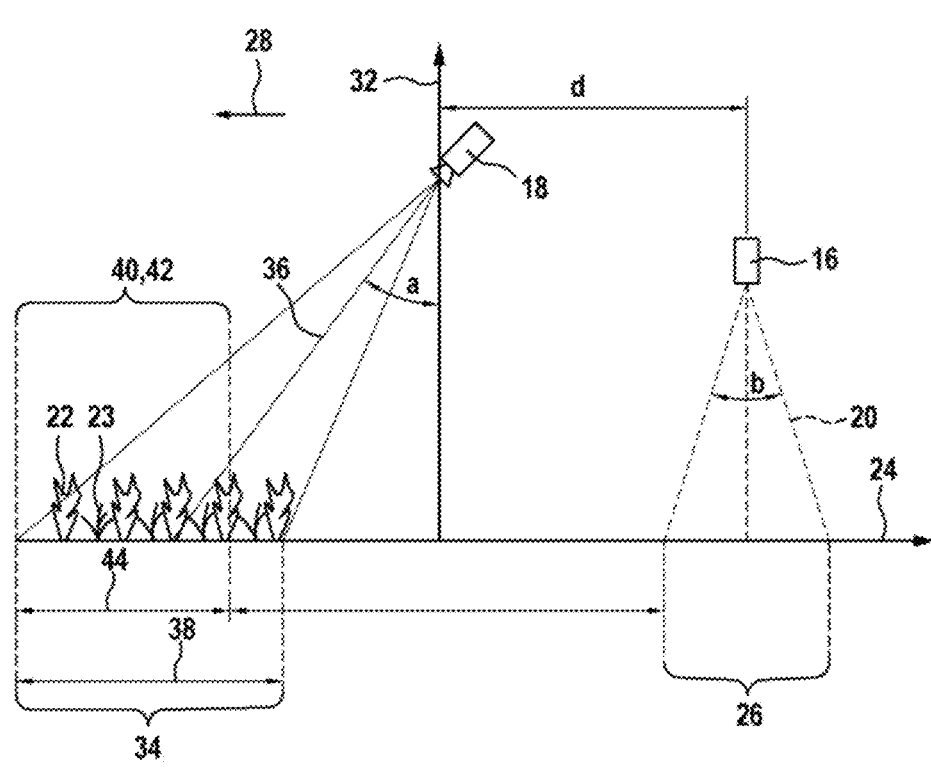
FIG. 2 shows a schematic illustration of a basic geometric arrangement of the optical detection unit and the spray nozzle unit with respect to one another, according to an example embodiment of the present invention.

FIG. 2 shows a basic geometric arrangement of a spray nozzle unit 16, which, in the event of a positive spray decision, applies the spray agent 20 to a spray area 26, and an inclined optical detection unit 18 or a camera 18 on the agricultural spray device 10. The inclination angle a is the angle in the direction of travel 28 of the spray device 10 between an optical axis 30 of the camera 18 and a vertical 32.

As further seen in FIG. 2, a field section 34 of agricultural area 24 is detected by the optical detection unit 18 in order to obtain image information 36 from the field section 34 having a depth D (image) 38 in the direction of travel 28. Plants 22, 23 are subsequently identified and classified in an image evaluation area 40 of the obtained image information 36, wherein the image evaluation area 40 represents a corresponding field evaluation area 42 of the detected field section 34 having a depth D(evaluation) 44 in the direction of travel 28 of the spray device 10. Depending on a determined plant identification number for the image evaluation area 40, the spray agent 20 is then applied to the field evaluation area 42 of the detected field section 34 in a planar manner using the spray nozzle unit 16.

Figure 3:
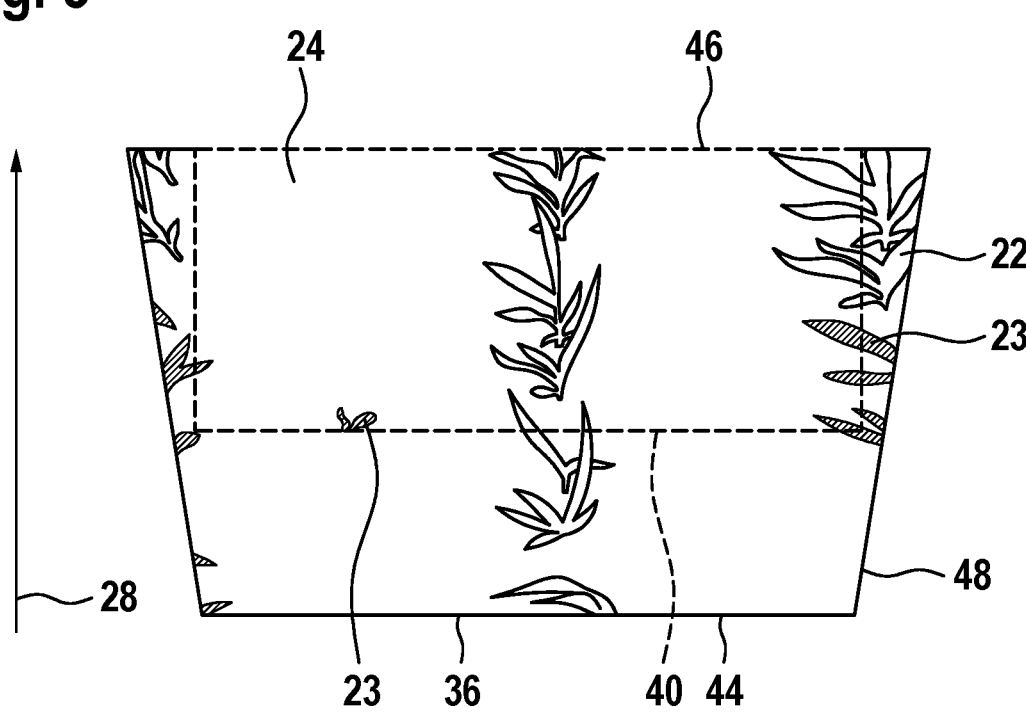
FIG. 3 shows image information with classified plants according to the related art.
Figure 4:
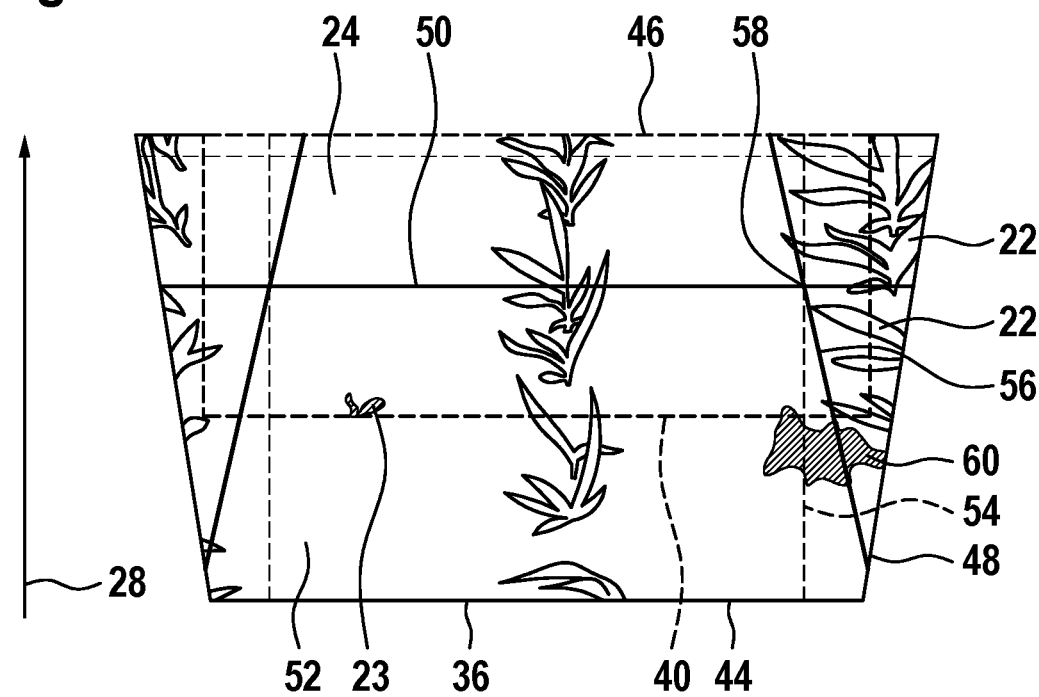
FIG. 4 shows an image information with classified plants according to the method according to an example embodiment of the present invention.

FIGS. 3 and 4 respectively show an item of image information 36 obtained from respectively one inclined optical detection unit 18 according to FIG. 2. The image information 36 has a rear image edge 44 in the direction of travel 28 having an image width W(image, r) and a front image edge 46 having a larger image width W(image, f).

In the image information 36 shown in FIG. 3, plants 22, 23 were classified according to the related art into cultivated plants 22 and weeds 23. It may be seen that cultivated plants, which were cut off at the lateral image edges 48, i.e., which were only partially captured, are incorrectly classified as weeds 23. This would result in an incorrect determination of a plant identification number for the image evaluation area 40, i.e., an incorrect evaluation of a degree of coverage of the image evaluation area 40 by weeds 23 and thus an inaccurate application strategy.

In contrast, in the image information 36 of FIG. 4, plants 22, 23 were classified according to the method according to the present invention, i.e., a step of reclassifying was carried out. Here, classified weeds 23 according to FIG. 3, which extend in a rear image section 52 of the image information 36 defined by a defined image separation line 50 from the lateral image edge 48 maximally up to a a defined reclassification boundary line 54 (assigned to the respective image edge 48), were reclassified as cultivated plants 22'.

Here, the image separation line 50 is arranged horizontally and the reclassification boundary lines 54 are arranged vertically in the image information 36. The image separation line 50 and the reclassification boundary lines 54 are arranged in the image information 36 such that the image separation line 50, each reclassification boundary line 54, and a lateral overlapping edge 56 of a laterally arranged and simultaneously detected lateral image information, which is explained in further detail in FIG. 5, have a common intersection point 58.

For clarification, FIG. 4 depicts another classified weed 60, which, although being located in the rear image section 52 of the image information 36 and also abutting the lateral image edge 48 of the image information 36, nevertheless extends across the reclassification boundary line 54. Hence, no reclassification is performed for this weed 60.

Figure 5:
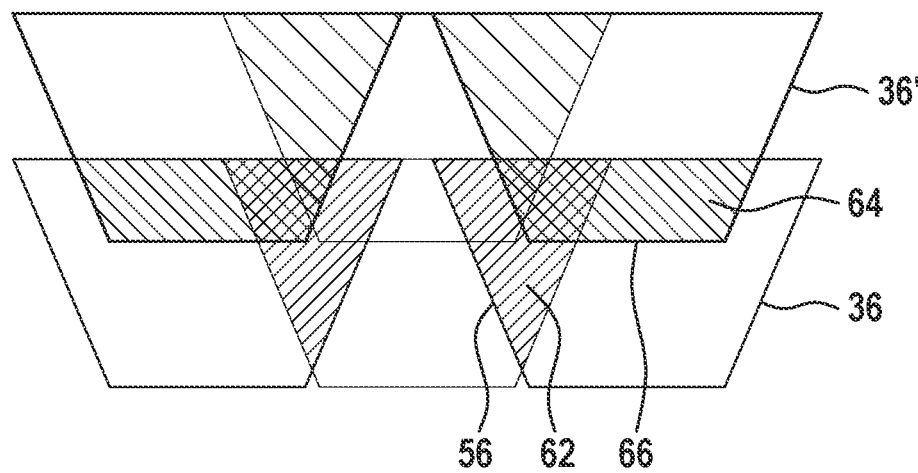
FIG. 5 shows an array of overlapping image information.

FIG. 5 additionally shows an array of overlapping image information 36, 36'. The items of image information 36 are here arranged laterally side by side and were simultaneously detected by respectively one camera 18. The items of image information 36 have a lateral overlapping area 62 having a previously mentioned lateral overlapping edge 56 due to their arrangement with one another or the corresponding arrangement of the respective cameras 18.

The items of image information 36' are arranged analogously, having been detected spatially and temporally in front of/prior to the image information 36. The items of image information 36 have an upper overlapping area 64 having a rear overlapping edge 66 with the items of image information 36'. The position of the image separation line 50 shown in FIG. 4 is selected such that it aligns with the rear overlapping edge 66.

Figure 6:
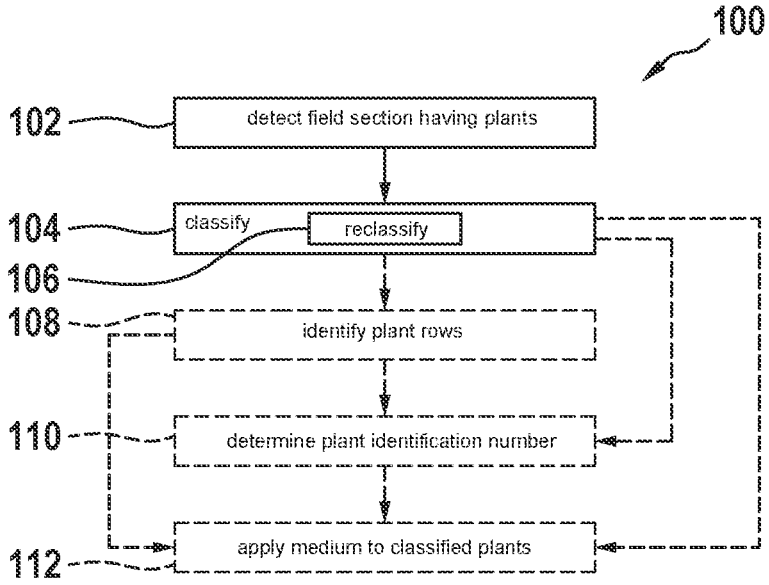
FIG. 6 shows a flow chart of a method according to one embodiment example of the present invention.

FIG. 6 shows a flow chart of a method 100 for classifying plants 22, 23, 60, particularly for agricultural purposes. The method 100 comprises a step of detecting 102 a field section 34 having plants 22, 23, 60 using an optical detection unit 18, inclined toward the field section 34, to obtain image information 36 having a rear image edge 44 having an image width W(image, r) and a front image edge 46 having a larger image width W(image, f). The method 100 further comprises a step of classifying 104 the plants 22, 23, 60 in the obtained image information 36) into at least one first plant class and into at least one second plant class using an algorithm in order to treat plants 23, 60 of the second plant class with a medium, in particular liquid spray agent 20, in accordance with the classification. The method 100 also comprises a step of reclassifying 106, in which classified plants 22' are reclassified from the second plant class into the first plant class using the algorithm if they extend in a rear image section 52 of the image information 36 defined by a defined image separation line 50 from a lateral image edge 48 of the image information 36 maximally up to a defined reclassification boundary line 54.

The method 100 further comprises an optional step of identifying 108 plant rows in the image information 36 using the classified plants 22 of the first plant class in the image information 36 using an algorithm. The method 100 also comprises a further optional step of determining 110 a plant identification number for a defined image evaluation area 40 in the obtained image information 36 using classified plants 23, 60 of the second plant class in the defined image evaluation area using an algorithm. The method 100 further comprises a further optional step of applying 112 the medium 20 to the classified plants 23, 60 of the second plant class depending on the determined plant identification number, using a spray nozzle unit 16, in particular of an agricultural spray device 10.

If an embodiment example comprises an "and/or" conjunction between a first feature and a second feature, this is to be read such that the embodiment example according to one embodiment has both the first feature and the second feature and according to a further embodiment has either only the first feature or only the second feature.

The invention claimed is:

1. A method for classifying plants for agricultural purposes, the method comprising the following steps:

detecting a field section having plants using an optical detection unit inclined toward the field section to obtain image information having a rear image edge having an image width and a front image edge having a larger image width; and classifying the plants in the obtained image information into at least one first plant class and into at least one second plant class using an algorithm in order to treat the second plant class plants with a medium in accordance with the classification, the medium being a liquid spray agent;

wherein the step of classifying includes a step of reclassifying, in which classified plants are reclassified from the second plant class into the first plant class by the algorithm, when the classified plants extend in a rear image section of the image information defined by a defined image separation line from a lateral image edge of the image information maximally up to a defined reclassification boundary line.

2. The method according to claim 1, wherein the image information includes an upper overlapping area with forward image information situated spatially and/or temporally upstream, wherein a position of the image separation line in the image information is selected depending on the upper overlapping area, the image separation line being aligned with a rear overlapping area of the upper overlapping area.

3. The method according to claim 1, wherein the image information has a lateral overlapping area having at least one laterally arranged and/or simultaneously detected item of lateral image information, wherein a position of the reclassification boundary line in the image information is selected depending on the lateral overlapping area, and is selected to intersect a lateral overlapping edge of the lateral overlapping area.

4. The method according to claim 3, wherein the image separation line, the reclassification boundary line, and the lateral overlapping edge have a common intersection point.

5. The method according to claim 1, wherein, in the image information:

the image separation line is arranged horizontally, and/or the reclassification boundary line is arranged vertically in the image information.

6. The method according to claim 1, wherein both lateral image edges of the image information are each assigned a reclassification boundary line.

7. The method according to claim 1, further comprising identifying plant rows in the image information using classified plants of the first plant class in the image information using an algorithm.

8. The method according to claim 1, wherein agricultural crops and/or cultivated plants are classified into the first plant class, and/or weeds are classified into the second plant class.

9. A method for classifying plants for agricultural purposes, the method comprising the following steps:

detecting a field section having plants using an optical detection unit inclined toward the field section to obtain image information having a rear image edge having an image width and a front image edge having a larger image width; and classifying the plants in the obtained image information into at least one first plant class and into at least one second plant class using an algorithm in order to treat the second plant class plants with a medium in accordance with the classification, the medium being a liquid spray agent;

wherein the step of classifying includes a step of reclassifying, in which classified plants are reclassified from the second plant class into the first plant class by the algorithm, when the classified plants extend in a rear image section of the image information defined by a defined image separation line from a lateral image edge of the image information maximally up to a defined reclassification boundary line, wherein in the step of classifying, plants classified into the second plant class remain in the second plant class, when they are not found in the rear image section of the image information and/or are not abutting the lateral image edge of the image information and/or extend from the lateral image edge of the image information across the reclassification boundary.

10. A method for classifying plants for agricultural purposes, the method comprising the following steps:

detecting a field section having plants using an optical detection unit inclined toward the field section to obtain image information having a rear image edge having an image width and a front image edge having a larger image width;

classifying the plants in the obtained image information into at least one first plant class and into at least one second plant class using an algorithm in order to treat the second plant class plants with a medium in accordance with the classification, the medium being a liquid spray agent; and determining a plant identification number for a defined image evaluation area in the obtained image information using classified plants of the second plant class in the defined image evaluation area using an algorithm, wherein the step of classifying includes a step of reclassifying, in which classified plants are reclassified from the second plant class into the first plant class by the algorithm, when the classified plants extend in a rear image section of the image information defined by a defined image separation line from a lateral image edge of the image information maximally up to a defined reclassification boundary line.

11. The method according to claim 10, wherein the image evaluation area has a width greater than or equal to the rear image width and less than the front image width of the image information.

12. The method according to claim 10, wherein the plant identification number represents a degree of coverage of the image evaluation area by plant material and/or an amount of a plant material in the image evaluation area and/or a number of classified plants of the second plant class in the image evaluation area.

13. The method according to claim 10, further comprising applying the medium to the classified plants of the second plant class depending on the determined plant identification number, using an agricultural spray device.

14. A classification unit, configured to:

classify plants in an item of obtained image information into at least one first plant class and into at least one second plant class using an algorithm; and reclassify classified plants from the second plant class into the first plant class using the algorithm when the classified plants extend in a rear image section of the image information defined by a defined image separation line from a lateral image edge of the image information maximally up to a defined reclassification boundary line.

15. An agricultural spray device for applying a medium to plants of an agricultural area, the medium being a liquid spray agent, the device comprising:

at least one spray nozzle unit configured to apply the medium;

at least one optical detection unit configured to detect the plants; and a classifier configured to classify the plants, the classifier configured to:

classify plants in an item of obtained image information into at least one first plant class and into at least one second plant class using an algorithm; and reclassify classified plants from the second plant class into the first plant class using the algorithm when the classified plants extend in a rear image section of the image information defined by a defined image separation line from a lateral image edge of the image information maximally up to a defined reclassification boundary line.

16. A non-transitory machine-readable storage medium on which is stored a computer program for classifying plants for agricultural purposes, the computer program, when executed by a computer, causing the computer to perform the following steps:

detecting a field section having plants using an optical detection unit inclined toward the field section to obtain image information having a rear image edge having an image width and a front image edge having a larger image width; and classifying the plants in the obtained image information into at least one first plant class and into at least one second plant class using an algorithm in order to treat the second plant class plants with a medium in accordance with the classification, the medium being a liquid spray agent;

wherein the step of classifying includes a step of reclassifying, in which classified plants are reclassified from the second plant class into the first plant class by the algorithm, when the classified plants extend in a rear image section of the image information defined by a defined image separation line from a lateral image edge of the image information maximally up to a defined reclassification boundary line.

* * * * *